United States Patent [19]

Jouandet

[11] Patent Number: 5,038,285

[45] Date of Patent: Aug. 6, 1991

[54] METHOD FOR COMPUTER-GENERATING A TWO-DIMENSIONAL MAP OF A THREE-DIMENSIONAL SURFACE

[75] Inventor: Marc L. Jouandet, Astoria, N.Y.

[73] Assignee: Cornell Research Foundation, Inc., Ithaca, N.Y.

[21] Appl. No.: 428,345

[22] Filed: Oct. 27, 1989

[51] Int. Cl.⁵ .............................................. G06F 15/00
[52] U.S. Cl. ........................... 364/413.16; 364/413.15
[58] Field of Search ....................... 364/413.16, 413.15

[56] References Cited

PUBLICATIONS

Jouandet et al., "Brainprints: Computer-Generated Two-Dimensional Maps of the Human Cerebral Cortex in Vivo", Journal of Cognitive Neuroscience, vol. 1, No. 1, Jan. 1989, pp. 88-117.
Tracy Jackson Putnam, "Studies on the Central Visual System", Archives of Neurology and Psychiatry, vol. 16, No. 6, Dec. 1926, pp. 683-707.
Jouandet et al., "Topographic Distribution of Callosal Neurons and Terminals in the Cerebral Cortex of the Cat", Anat Embryol (1986), 173, pp. 323-342.
Jouandet et al., "Distribution of the Neurons of Origin of the Great Cerebral Commissures in the Cat", Anat Embryol, 1985, 171, pp. 105-120.
Jouandet et al., "Distribution of the Cells of Origin of the Corpus Callosum and Anterior Commissure in the Marmoset Monkey", Anat Embryol, 1984, 169, pp. 45-59.
Van Essen et al., "Two-Dimensional Maps of the Cerebral Cortex", The Journal of Comparative Neurology, 1980, 191, pp. 255-281.
M. L. Jouandet, "Neocortical and Basal Telencephalic Origins of the Anterior Commissure of the Cat", Neuroscience, vol. 7, No. 7, pp. 1731-1752.
Jones et al., "Commissural Columns in the Sensory-Motor Cortex of Monkeys", J. Comp. Neur., 1979, 188, pp. 113-136.

*Primary Examiner*—Jerry Smith
*Assistant Examiner*—Laura Brutman
*Attorney, Agent, or Firm*—Perman & Green

[57] ABSTRACT

A method is described for deriving a planar representation of a three-dimensional surface which includes steps of: deriving a plurality of tomographic slices of the three-dimensional surface; positioning reference points about a perimeter surface of each tomographic slice; creating a straight line representation of each perimeter surface with its reference points, each straight line representation having a length value proportional to the perimeter surface from which it was created; adjusting the straight line representations to be adjacent to each other in the order of their respective tomographic slices, to thereby create a planar map of the three-dimensional surface when the straight line representations are plotted; and reducing distortion between straight line representations by finding the average minimum distance between positionally closest reference points on adjacent slice surface lines; and repositioning the straight line representations in accordance with the findings.

8 Claims, 12 Drawing Sheets

METHOD FOR COMPUTER-GENERATING A TWO-DIMENSIONAL MAP OF A THREE-DIMENSIONAL SURFACE

FIELD OF THE INVENTION

This invention relates to a method for producing two-dimensional maps of three-dimensional surfaces and, more particularly, to a method for producing a two-dimensional map of the human cerebral cortex.

BACKGROUND OF THE INVENTION

The classic neurological approach in attributing functional processes to various regions of the human cerebral cortex involved initially describing sensor motor, cognitive and behavioral deficits and then awaiting patiently, sometimes years, for the final pathology reports describing the actual anatomical lesions. This inability to localize cortical lesions in living humans, independently of signs and symptoms, has slowed the refinement of maps that correlate cortical function to cortical structure. In recent years, the developments of Computerized Tomography (CT) and Magnetic Resonance Imaging (MRI) have greatly helped to overcome the aforementioned problems in localizing the anatomic lesion.

While the visualization of grey and white matter in the brain and the localization of neocortical lesions by scanning techniques are sufficient for making neurologic diagnoses, other obstacles remain in correlating cortical function to the brain structure, e.g., the complex convolutional geometry of the human cerebral cortex and the extreme variability of neocortical folding patterns between humans.

The variations in the sulcal and gyral patterns of the human neo-cortex are as diverse as fingerprints in the population and greatly complicate detailed correlation between specific cortical zones and functional processes. Although the gyri remain the best anatomical landmarks to the functional zones of the living cortex, it is unclear to what extent a lesion in a given gyrus in one individual is functionally comparable to a similarly placed lesion in the same gyrus in another individual.

Current brain maps which typically depict functional zones over lateral views of the cortex are inadequate. Though useful for instructional purposes, such schematics of the cortex make no attempt to open the sulci, or show which functions are therein processed and seem not to appreciate that most neocortical tissue is buried within the sulci.

Cortical mapping methods fall into one of two broad families, depending on whether or not they preserve or distort the natural geometry of the cerebral cortex. Computer programs that rotate in space, three-dimensional images of the brain are an example of techniques that strive to replicate, as absolutely as possible, the natural geometry of the cortex. While these methods minimize distortion, they do not simplify the cortical geometry.

Flat maps of the cortex comprise a second category in which distortion is introduced, but neocortical geometry is simplified. Using physical methods, investigators have determined the surface area of human cortex by staining, enlarging, and tracing histologic sections, straightening and aligning each, tracing along one end of given fissures, and measuring areas contained therein. Others have assessed the total and regional surface areas of a human brain by measuring slice perimeters, multiplying perimeter lengths by slice thicknesses and inter-slice distances, summing the products and correcting the sum for shrinkage. An advance in this field was achieved in 1980 by Van Essen and Maunsell and is described in "Two-Dimensional Maps of the Cerebral Cortex", the Journal of Comparative Neurology, Vol. 191, pp. 255-281 (1980). Van Essen et al. describe a method for producing a single cortical map which illustrated whole monkey and cat hemispheres. Their method employs deriving cortical ribbons of successive histologic sections which are partially unfolded around one another. Cortical surface areas are then measured planimetrically. The Van Essen et al. technique involves a labor-intensive manipulation of the contour lines of various cortical layers onto a composite two-dimensional representation, with each contour line being held constant in length but allowed to change its shape in order to be aligned properly with respect to contour lines from nearby sections. This procedure introduces area distortions to the map in an attempt to reduce angular distortions.

Other investigators have employed a "straight-line two-dimensional cortical flat map" technique (SL2D) and applied it to various comparative anatomical studies to produce two-dimensional flat maps of unfolded cortex matter. Putnam in "Studies of the Central Visual System" Archives of Neurology and Psychiatry, Vol. 16 No. 6, December 1926, pp. 683-707 used the SL2D method to examine surface areas of the human calcarine fissure. These slices were histologically stained, projected and then traced. A map was constructed and estimations of surface cortical area were obtained by placing the map over a ruled grid and then estimating the areas. This straight-line method has been applied over the years by various investigators (i.e. see Jouandet, Lachat and Gary "Topographic Distribution of Calosal Neurons and Terminals in the Cerebral Cortex of the Cat", Anatomy and Embryology, Vol. 173, 1986, pp. 323-342); however none of the methods have succeeded in reducing angular distortion or enabling adjustment of the maps to provide substantially distortion free areas of interest.

Whenever a 3-D surface is represented on a 2-D map, three types of distortion may be introduced, areal, angular and topologic, to various degrees, depending on how the 2-D map is constructed.

Accordingly, it is an object of this invention to provide a method for mapping a three-dimensional surface onto a two-dimensional surface wherein area distortions are minimal.

It is a further object of this invention to provide a method for mapping three-dimensional surfaces onto a two-dimensional map wherein overall angular distortions are minimized.

It is still another object of this invention to provide an improved method for mapping with lessened distortion, the human cortex onto a two-dimensional planar map.

It is yet another object of this invention to provide an improved cortical mapping method which enables rapid and automatic map production.

SUMMARY OF THE INVENTION

A method is described for deriving a planar representation of a three-dimensional surface which includes the steps of:

deriving a plurality of tomographic slices of the three-dimensional surface;

positioning reference points about a perimeter surface of each tomographic slice;

creating a straight line representation of each said perimeter with its reference points, each straight line representation having a length value proportioned to the perimeter surface from which it was created;

adjusting the straight line representations to be adjacent to each other in the order of their respective tomographic slices, to thereby create a planar map of the three-dimensional surface when the straight line representations are plotted; and reducing distortion between straight line representations by finding the average minimum distance between positionally closest reference points on adjacent slice surface lines, and repositioning the straight line representations in accordance with the findings.

DETAILED DESCRIPTION OF THE INVENTION

In the following description of the invention, the flow diagrams of FIGS. 1-4 will be discussed in conjunction with the illustrations in FIGS. 5-24. Additionally, while the invention is described in conjunction with the mapping of the cortical surface of a brain, it is equally applicable to any two-dimensional map of a three-dimensional surface.

Figure 1:
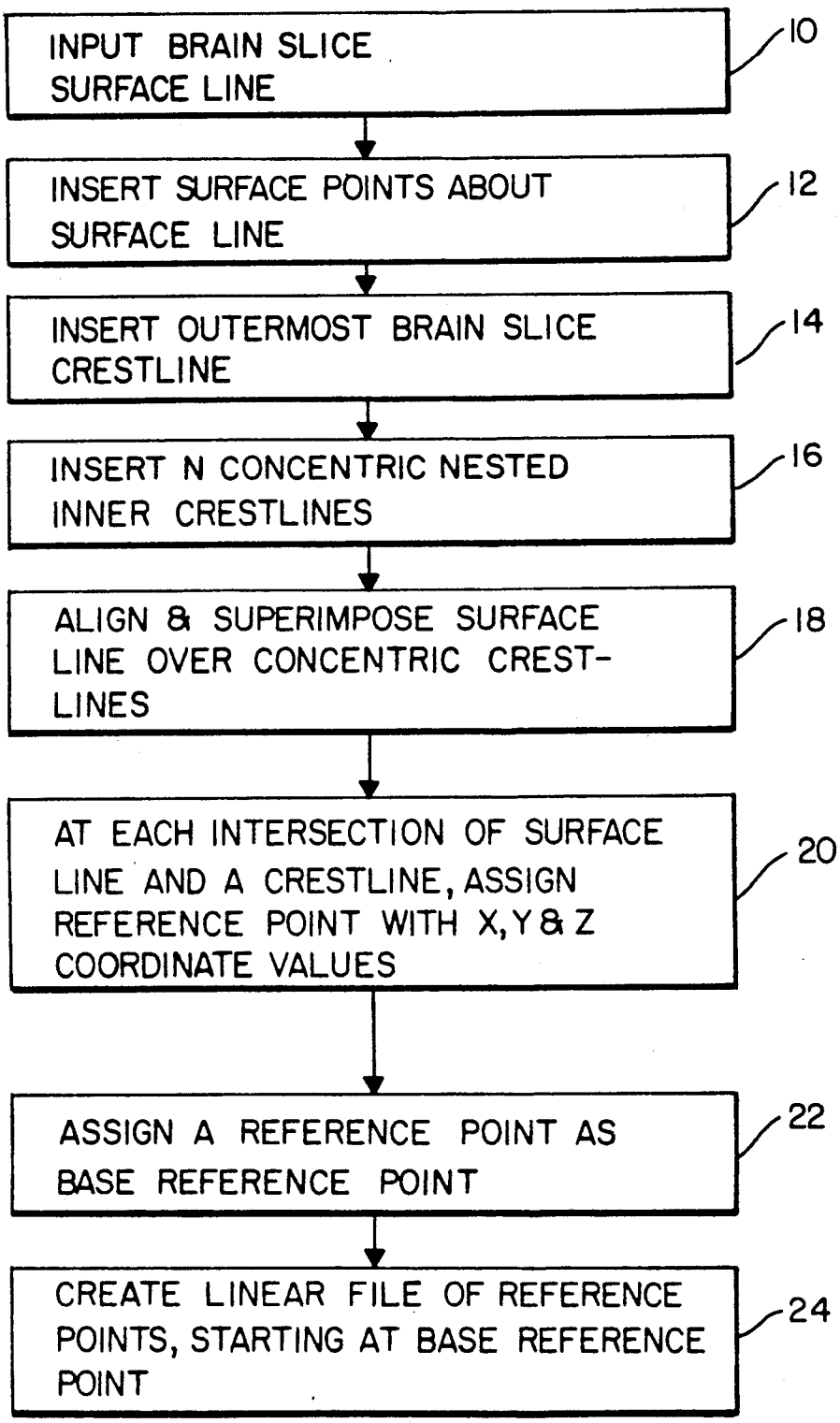
FIG. 1 is a high level flow diagram which indicates how reference points are assigned to various portions of a brain slice surface line.
Figure 5:
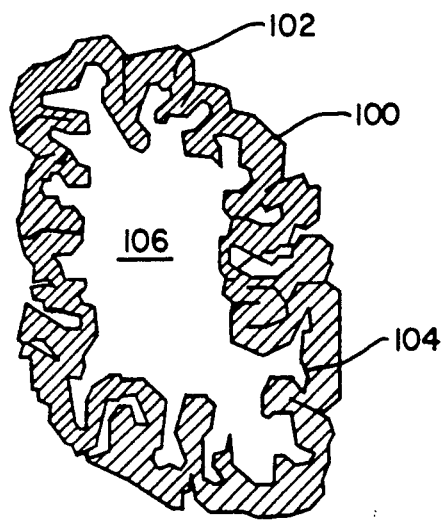
FIG. 5 illustrates an example of a brain slice produced by Magnetic Resonance Imaging Tomography.

Referring now to FIGS. 1 and 5, a plurality of tomographic slices of a brain are obtained from a suitable starting source, e.g., an MRI scan, histologically stained brain slices, photographs of thick brain sections, etc. The brain may be sliced coronally, sagitally, or horizontally. In FIG. 5, a coronal slice of a single hemisphere is illustrated with pial line 100 illustrating the outer limit of the neocortical ribbon 102. Deep white line 104 designates the boundary between neocortical ribbon 102 and the white matter area 106. The neocortical ribbon is also known as the "grey matter". The requirements of the view of FIG. 5 are that there should be good contrast between the grey and white matter so that the cortical ribbon may be identified, and that all sections be cut in the same plane.

Figure 6:
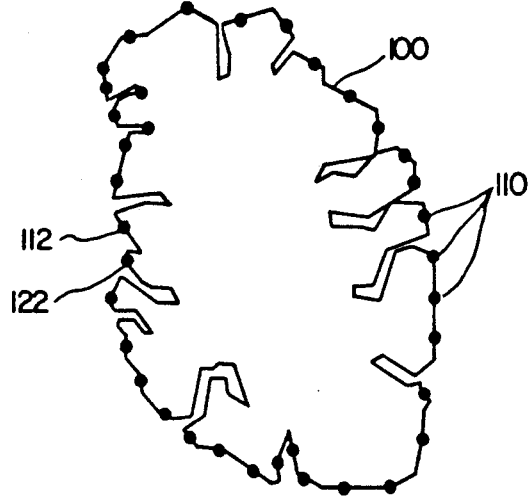
FIG. 6 illustrates the brain slice surface line of the brain slice of FIG. 5.
Figure 7:
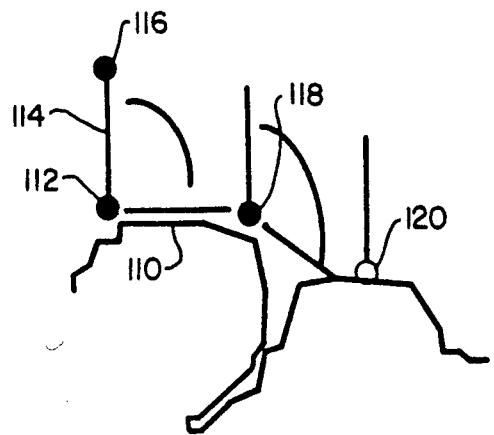
FIG. 7 illustrates a geometrical construct used for constructing a "crestline" over each brain slice surface outline.

As shown in FIG. 1, each brain slice is handled identically in order to input to an appropriate data processing system, the necessary data regarding each brain slice and certain reference points to be hereinafter described. Initially (box 10) the brain's pial line 100, (hereinafter referred to as brain slice surface line) is inputted into the system. This may be accomplished either via an automatic scanning system which scans and digitizes brain slice surface line 100 or, by a user employing a graphics tablet and tracing the outline of the surface line 100 so that it is appropriately digitized. The result of this action is shown in FIG. 6. In essence, brain slice surface line 100 in FIG. 6 slavishly follows the pial line of the brain slice and is an accurate depiction of the surface of the slice.

At this stage, the system generates a "crestline" which follows the outer surface of the cortex without following the pial surface into the sulci. To accomplish this, surface points 110 are added to brain slice surface line 100 (box 12). A point is chosen on the slice to be the base surface point 112. A preferred method for automatically inserting the surface points is diagramatically shown in FIG. 7. At base surface point 112, a chord 114 is constructed and then rotated until its endpoint 116 intersects surface line 100. The point of that intersection then becomes the next surface point 118. A new chord is then constructed and again rotated until it intersects surface line 100 at which point a new surface point 120 is inserted, until the last surface point 122 is found.

Figure 8:
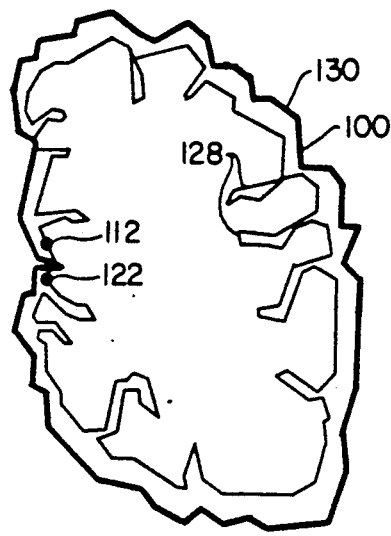
FIG. 8 illustrates a "crestline" which grossly outlines the surface of the brain slice.

Outermost brain slice crestline 130 (as shown in FIG. 8 (box 14, FIG. 1) is then drawn by connecting the derived surface points. The computer accomplishes the construction of the "crestline" by first displacing each of the surface points (determined using the method illustrated in FIG. 7) a short distance away from the brain slice surface line 100 and then connecting each of the surface points with chords to provide a line 130 completely enclosing the brain slice surface between base surface point 112 and end surface point 122.

Figure 9:
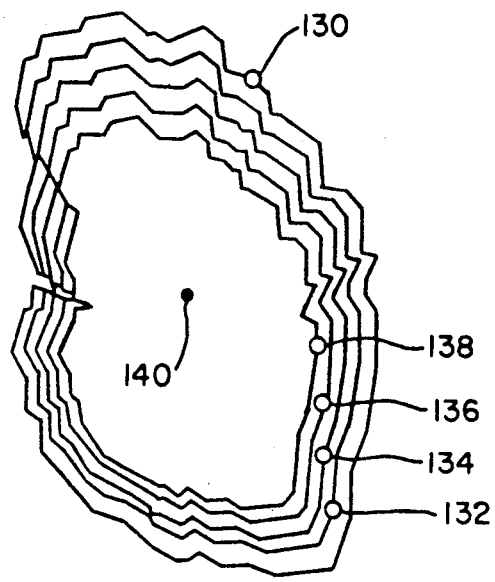
FIG. 9 illustrates a plurality of concentric inner crestlines which are created to enable assignment of reference points to portions of the brain slice surface line within the sulci.
Figure 10:
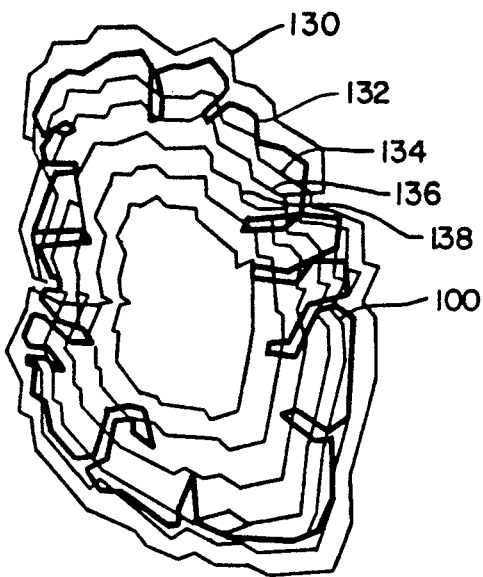
FIG. 10 illustrates the superimposition of the brain slice surface line of FIG. 6 on the concentric crestlines of FIG. 9.

Next, n concentric inner crestlines are drawn within outermost brain slice crestline 130 (box 16, FIG. 1). In FIG. 9, each of inner crestlines 132, 134, 136, and 138 are equidistant from each other. They may be constructed by deriving a centroid 140 for all of the combined slices; deriving radial lines through each surface point on brain slice surface line 100, and extending those radial lines through crestlines 130. Then, the position of each surface point can be decremented by a given amount along its radius until the desired number of concentric inner crestlines have been created.

Next, (as indicated in box 18) brain slice surface line 100 is superimposed over the crestlines shown in FIG. 9 for the purpose of determining intersections between the crestlines and the sulci along brain slice surface line 100. This procedure enables reference points to be placed at various positions along the brain slice surface. The reference points encode depth information and anatomic location of the sulci. Once the reference points are derived along the brain slice surface line, the surface points and crestlines may be discarded.

It should be noted that the illustrations in FIGS. 6, etc., are provided to aid in an understanding of this invention and are not necessarily available for viewing by the user. For instance, the "alignment and overlapping" of brain slice surface line 100 over crestlines 130, 132, 134, 136, and 138 occurs by assuring the proper relationship between the data representations which indicate the various segments of each of the lines. In other words, each spatial surface point on brain slice surface line 100 is adjusted so that its coordinate values bear the proper relationship to the coordinate values of the crestline spatial values.

Figure 11:
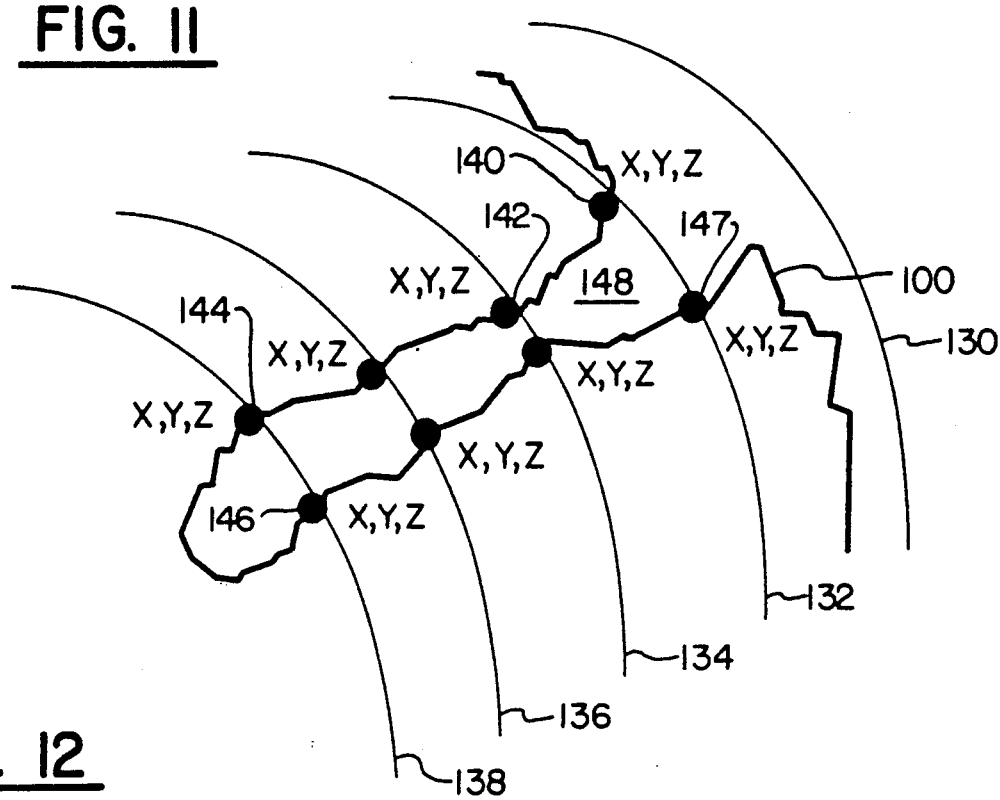
FIG. 11 is an expanded view of a sulcus showing intersections between its surface and various crestlines.
Figure 12:
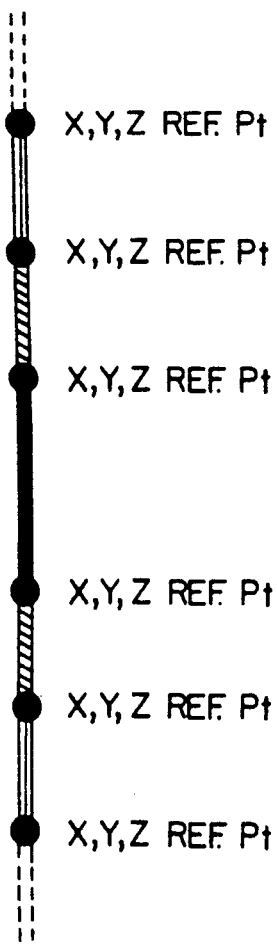
FIG. 12 illustrates a linear representation of the reference points along a brain slice surface line that has been straightened.

As shown in box 20 of FIG. 1, at each intersection of brain slice surface line 100 and a crestline, a reference point is assigned x, y, and z coordinate values. This enables the outline of each sulcus to be spatially determined. As shown in FIG. 11, each place where brain slice surface line 100 intersects a crestline 132, 134 etc., a reference point is created and is encoded by assigning x, y, and z values evidencing its position relative to the brain's major x, y, and z axes. These values thus encode the lengths of line segments between reference points along brain slice surface line 100, in addition to providing depth information and three-dimensional reference point locations along the cortex.

Next, as shown in boxes 22 and 24 in FIG. 1, a reference point on brain slice surface line 100 is assigned as the base reference point and a linear file of reference points is created with its head being the base reference point's x, y, and z values. This linear file is graphically represented in FIG. 12 as being a numbered list of x, y, and z values, one for each reference point. As shown in FIG. 1, the above-described process is repeated for each brain slice, with the result being a plurality of linear files of brain slice reference points, each of which define the surface line of a brain slice.

Figure 2:
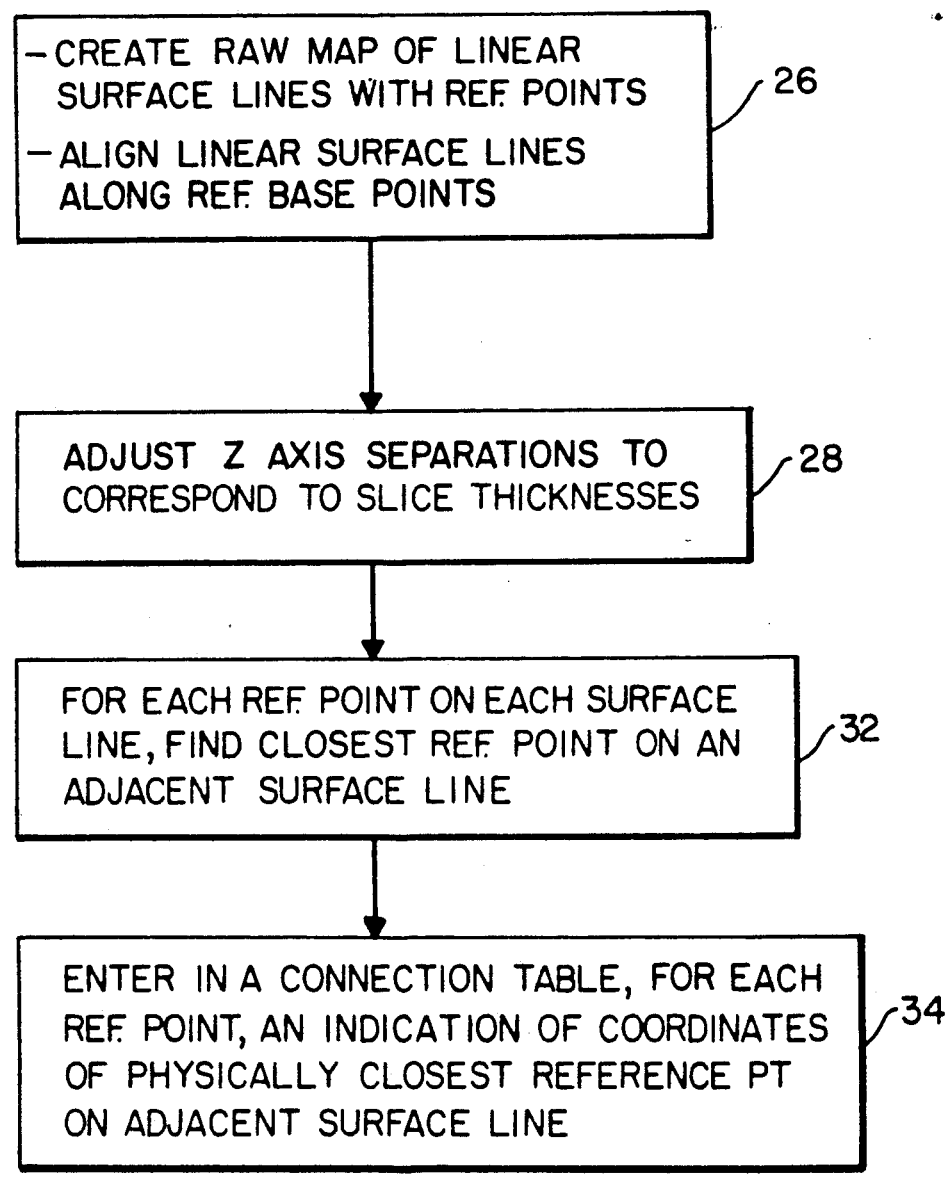
FIG. 2 is a high level flow diagram which illustrates the method for constructing a raw map from a plurality of linear brain slice surface lines and a connection table therefor.

Turning to FIG. 2, each linear file is accessed and employed to create a "raw" linear map of all brain slice surface lines 100, starting with each slice's base reference point. In essence, the computer creates a file of all brain slices in which each brain slice's reference point values are placed together in sequential order, from the base reference point to the end reference point. Thus each surface line is "straightened", eliminating the curves and convolutions of the cortex while at the same time, retaining the proper distances between reference points. For example, in FIG. 11 the distance between reference points 140 and 142 is the distance along the slice line between crestlines 132 and 134.

FIG. 11 indicates why angular distortion enters into a map as a result of changes in gyral and sulcal depth over the natural surface of the cortex. The view of FIG. 11 shows just one slice of a sulcus 148. If it is assumed, at a "next" slice, that sulcus 148 experiences a significant decrease in depth (e.g., assume that the sulcus depth in the "next" slice terminates at crestline 134), there will be a significant difference in distance between adjacent reference points. For instance, assuming that the next slice has reference points which spatially correspond closely to reference points 140 and 147 in FIG. 11, the distance between the corresponding points on the next slice will be substantially less on the linear map, than the distance between reference points 140 and 147 on the slice shown in FIG. 11. In other words, the linear distance between reference points 140 and 147 take into account the distances between reference points 140, 144, 146 and back to 147. However, on the "next" slice, the distance between reference points corresponding to reference points 140 and 147 will be substantially truncated. Thus, while reference points 140 and 147 are close to the spatially close reference points on the next slice, in fact, when they are plotted on a linear map they are displaced from one another due to the sulcus depth change between slices.

Figure 13:
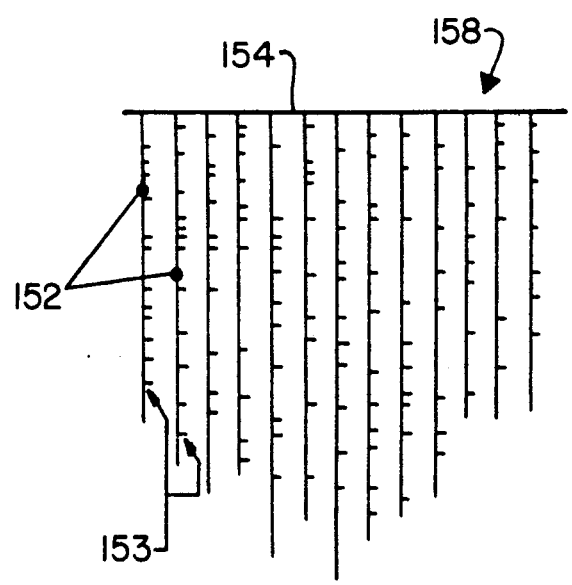
FIG. 13 illustrates an initial raw map of brain slice surface lines and their assigned reference points, with all surface lines being aligned along their base reference points.
Figure 14:
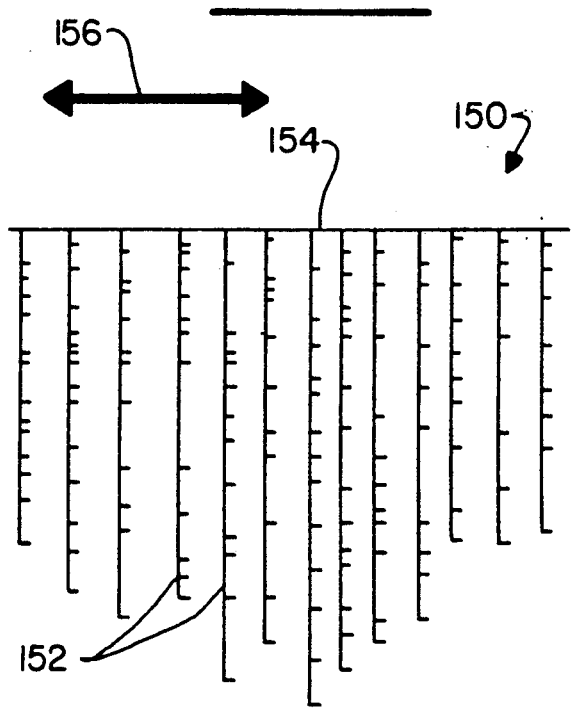
FIG. 14 illustrates a modification of the map of FIG. 13 wherein brain slice surface line files are separated by an appropriate scale distance perpendicular to the orientation of the slice lines.

Referring to FIG. 13 (and box 26, FIG. 2), all brain slice surface lines 152 are plotted along with their reference points 153. All surface lines 152 are aligned along line 154, with the base reference point of each surface line 152 being coincident therewith. As shown in box 28 (FIG. 2), the next step involves adjusting the z axis separations on the planar map of FIG. 13, so that the brain slice surface line files are separated by an appropriate scale distance proportional to the interslice distances. This adjustment is indicated schematically in FIG. 14, wherein the distances between each of the linear brain slice surface lines 152 is adjusted to show the appropriate distance along z axis direction 156.

Figure 15:
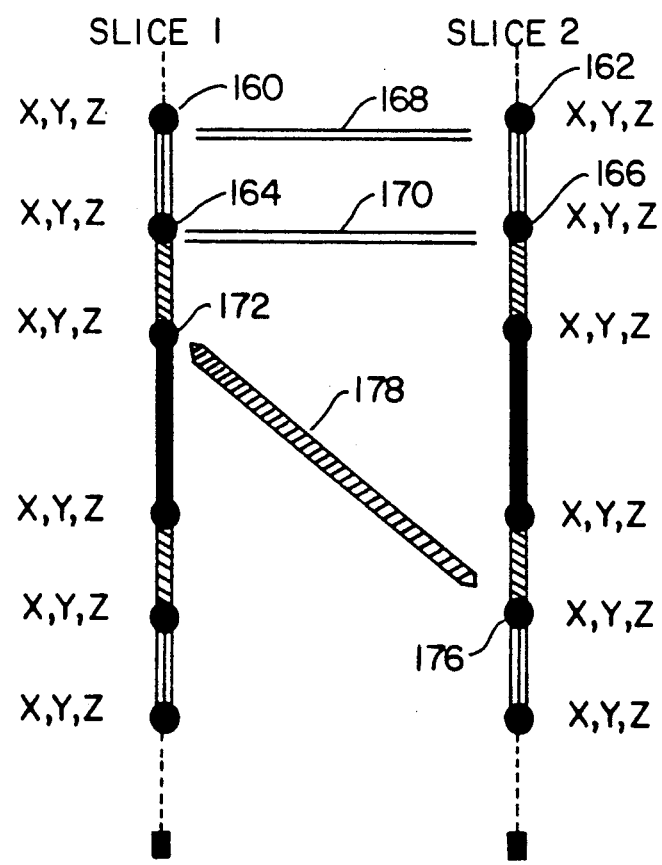
FIG. 15 illustrates linear plots of reference points from two adjacent brain slice surface lines, and shows how reference points, spatially close in the natural 3-D spatial geometry of the cortex, are related to one another in the construction of the 2-D map representation.

Next, as shown in box 32 (FIG. 2), a "connection" table is constructed which for each reference point on each surface line, designates the physically closest reference point along an adjacent surface line. In FIG. 15, a pair of adjacent linear brain slice surface line files are schematically represented. The computer sequentially examines each reference point's x, y, and z values in one file and searches in the adjacent surface line file for the physically closest reference point. When that reference point is found, it is entered as "connected" (see box 34, FIG. 2). For instance, assuming reference points 160 and 162, and 164 and 166 are found to be physically closest, they are entered in the connection table as "connected". This is schematically shown by lines 168 and 170. On the other hand, assume reference point 172 is found to be physically closest to reference point 176. Connection line 178 indicates the corresponding "connected" entry in the connection table.

As above stated with respect to FIG. 15, the distance between reference points 164 and 172 on slice 1 is considerably less than the distance between reference points 166 and 176 on slice 2. This is an indication that the depth of a sulcus between reference points 166 and 176 on slice 2 is greater in the region of slice 2 than it is in the region of slice 1, thereby creating the angular distortion on the 2-D map described above. Notwithstanding the distortion, it is the connection table which provides the basic data that enables the computer to now adjust the planar map to minimize the distortions introduced as a result of the linear representation of the slice lines.

Figure 16:
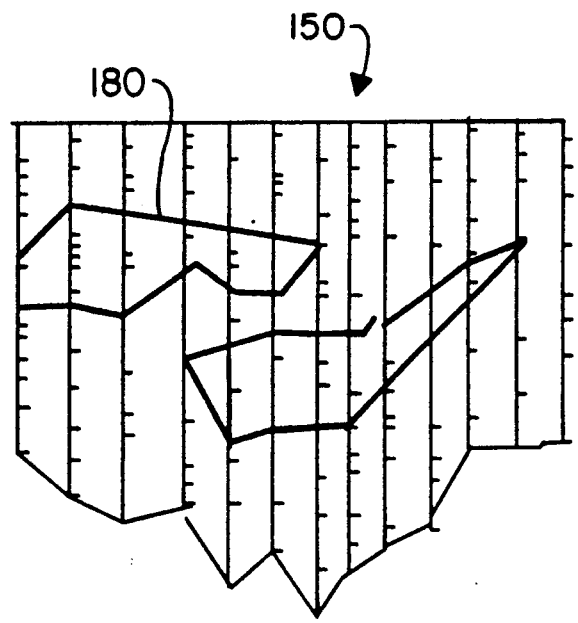
FIG. 16 illustrates a graphical representation of connection table lists which associate reference points on adjacent brain slices.

As shown in FIG. 16, reference points indicated as connected, can now be joined by lines 180 to essentially draw a topographical map of the brain structure. While the map is linearly distorted by virtue of the planar representation, little area distortion occurs and accurate cortex area measurements can be obtained.

Figure 3:
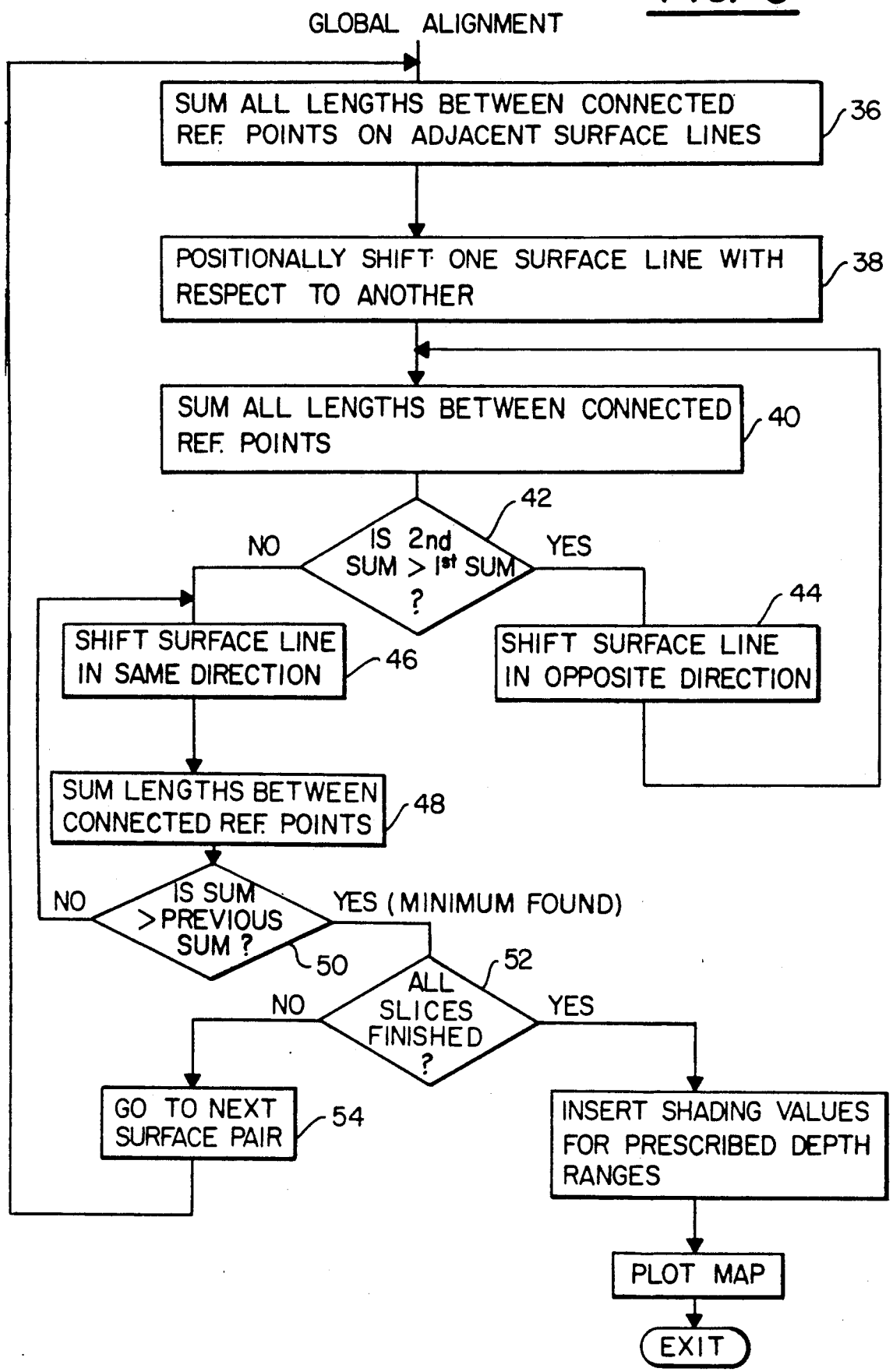
FIG. 3 is a high level flow diagram illustrating the method for aligning the brain slice map to reduce overall angular distortion.

Referring now to FIG. 3, a global alignment of the planar map may be obtained by utilizing the algorithm shown. For each slice, all distances between "connected" points on adjacent brain slice surface lines 152 are summed (box 36). Then one slice is shifted relative to an adjacent slice (box 38), and the distances between connected points are again summed (box 40). The two succeeding sums are compared (box 42). If the sum after the shift is larger, the indication is that the alignment is less favorable. In such case, the slices are shifted in the opposite direction (box 44), the distances between connected reference points again added and the sums again compared. In this case the difference will generally be equal or smaller, so the algorithm proceeds to box 46 which indicates that the slice is again shifted in the same direction as indicated by box 44. The distances between connected points are again summed (box 48), and the sum compared against the previous sum (box 50). If the sum is smaller, the process repeats itself until a larger sum occurs, at which point minimum linear distortion was achieved in the previous positional relationship between the two slices. At this stage, the algorithm determines whether all slices are finished with this process (box 52) and if not, goes on to repeat the process for the next slice pair (box 54). If on the other hand, all slices have been completed, the program exits.

Figure 17:
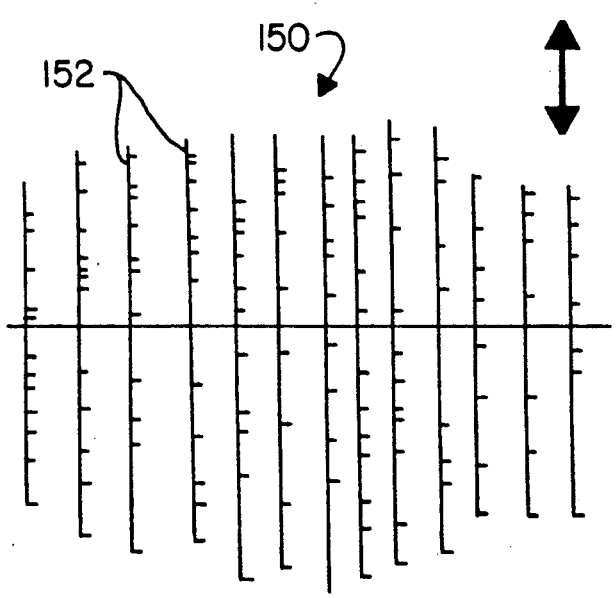
FIG. 17 illustrates a modification of the map of FIG. 15 wherein one reference point per brain slice surface line has been chosen as an alignment point, and all remaining surface lines have been aligned along that chosen reference point.
Figure 18:
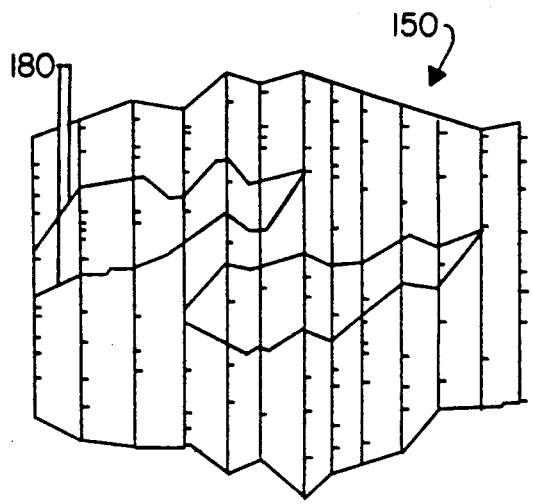
FIG. 18 illustrates a brain slice surface line map after automatic alignment of all surface lines to provide globally minimized angular distortion.
Figure 19:
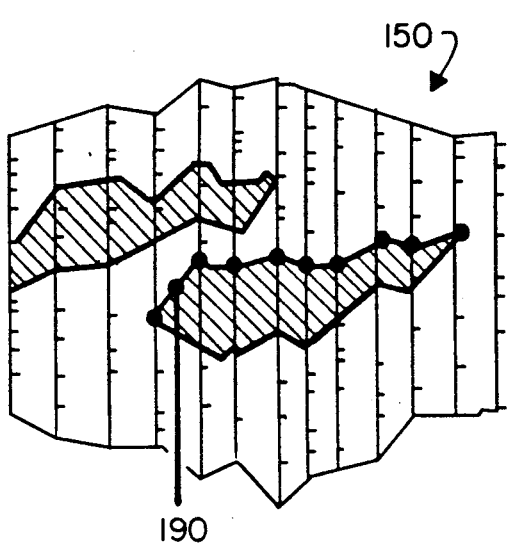
FIG. 19 illustrates a brain slice surface line map and a reference point about which the map is to be locally realigned.
Figure 20:
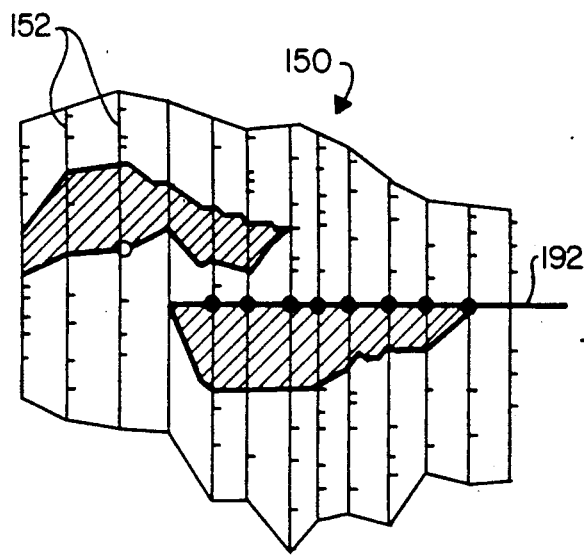
FIG. 20 illustrates the brain slice surface line map after local realignment.

The results of these actions are shown in FIG. 17, wherein each of linear brain slice surface lines 152 have been vertically adjusted so as to represent the least average sum differences between connected reference points on adjacent surface lines. Next, as shown in FIG. 18, lines 180 connecting the reference points are inserted and enable the viewer to see areas of the map with the least overall distortion. It should be realized that there is no way that angular distortions can be completely eliminated from the two-dimensional map. On the other hand, if there is an area of specific interest on planar map 150 which is desired to be represented with the least amount of distortion possible, the map can be realigned to accomplish that result. As shown in FIG. 19, it is assumed that user wishes the area around reference point 190 to be mapped with the least amount of distortion. To accomplish such, the user selects reference point 190 and the computer then aligns all reference points on subsequent surface lines which are sequentially indicated as connected and forms then into a straight line 192 as shown in FIG. 20. As a result, each of slice lines 152 is vertically adjusted accordingly, so map 150 appears as shown in FIG. 20. This procedure assures that the area immediately bounding line 192 exhibits minimized angular distortion.

Figure 4:
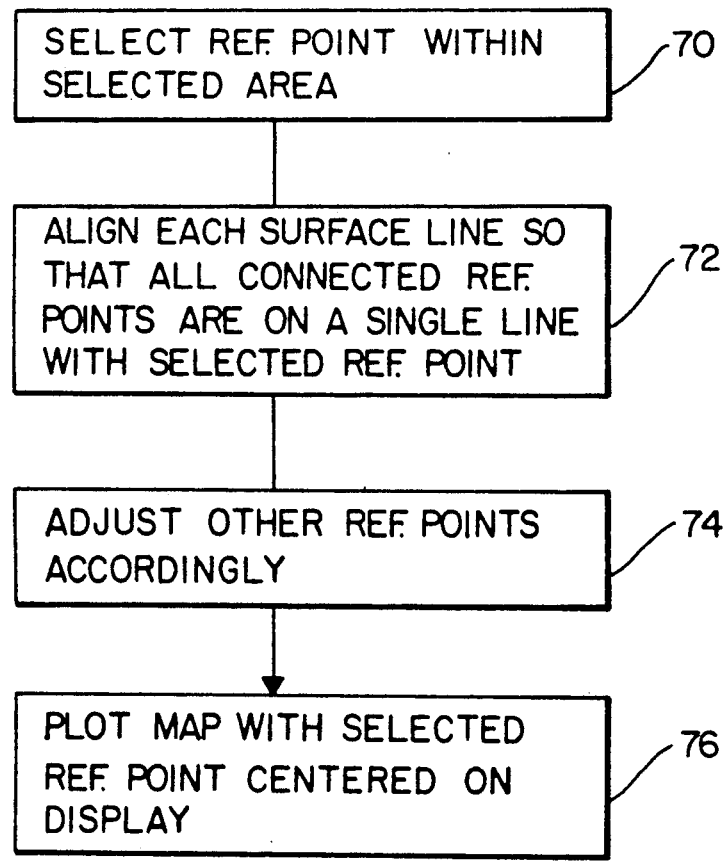
FIG. 4 is a high level flow diagram illustrating the method for aligning a linear brain slice map to provide least distortion of a selected region of interest.

The procedure for the above-described subroutine is shown in FIG. 4. Initially, a reference point is selected on a slice (box 70) and each slice is aligned so that connected reference points form a straight line with respect to the selected reference point (box 72). All reference points are then adjusted accordingly (box 74) and a new map is plotted with the selected reference point centered on the display (box 76).

Figure 21:
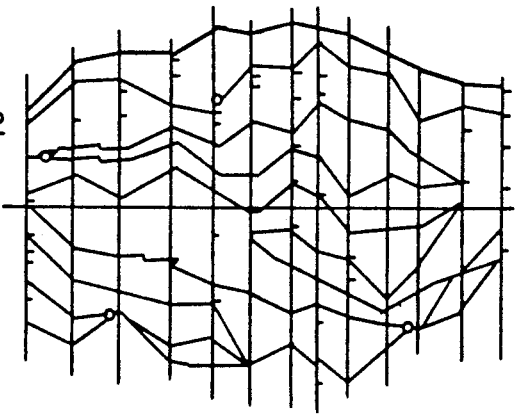
FIG. 21 illustrates a graphical representation of a connection table of a brain slice surface line map prior to differential shading.
Figure 22:
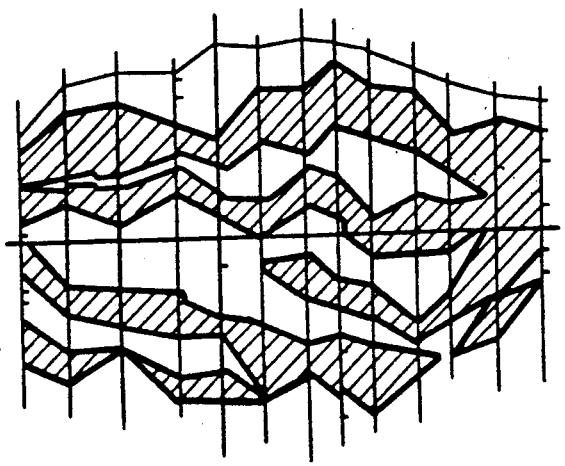
FIG. 22 illustrates the brain slice surface line map of FIG. 21 after shading.
Figure 23:
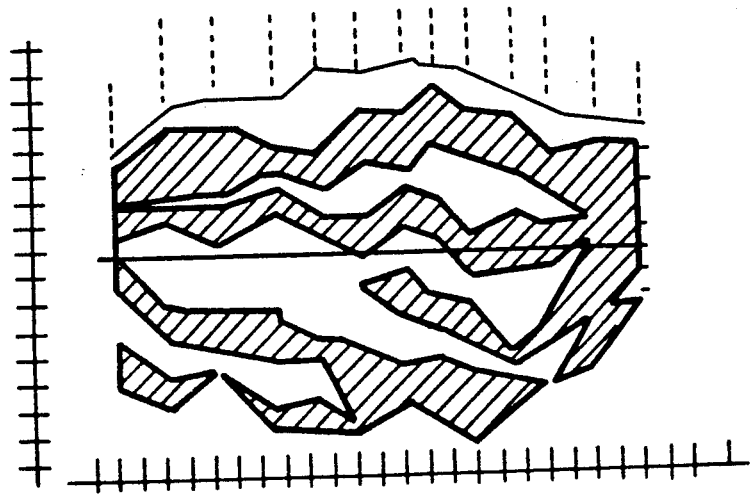
FIG. 23 illustrates the map of FIG. 22 after the slice lines have been removed and their levels indicated on adjacent axes.
Figure 24:
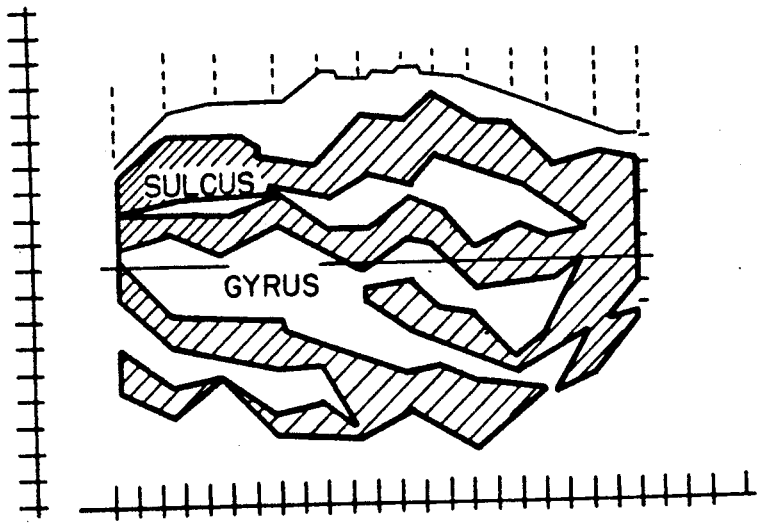
FIG. 24 illustrates the map of FIG. 23 after various anatomical landmarks have been labeled.

Referring now to FIGS. 21-24, a series of graphics steps are implemented to enable the map to be coherently presented. In FIG. 21, the user selects certain connection lines which define the sulci and gyri. These lines are obtained from the connection table and form a subset of the least distance connection lines stored therein. Within the connection table can also be stored the identity of which areas of the map are to be shaded and which are not. This can be accomplished by assigning to certain depth ranges, a specific shading value which is to be drawn on the display screen. Those shaded areas are then entered and the map adjusted accordingly (FIG. 22). Subsequently, as the brain slice surface lines provide no information themselves, they are removed from the representation (FIG. 23) and their levels are indicated off the map. Finally, as shown in FIG. 24, anatomical landmarks can be labeled onto the map.

Figure 26:
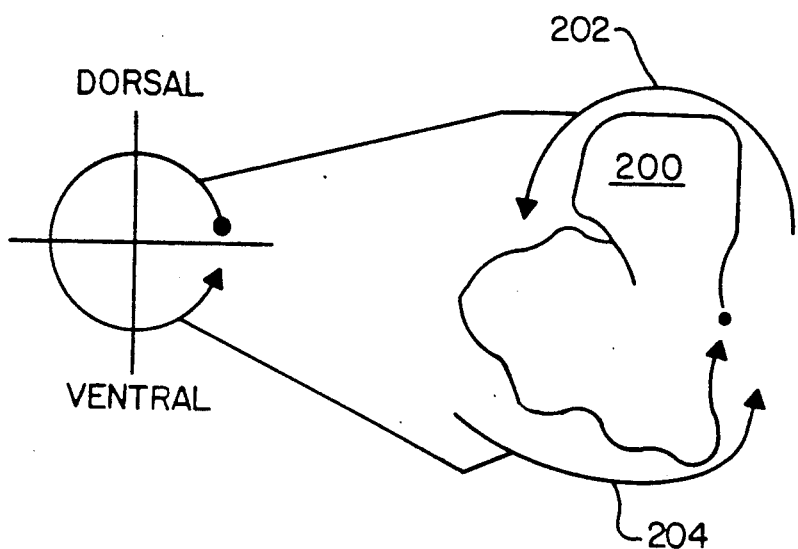
FIG. 26 is a schematic which shows how the brain slice map of FIG. 25 is "unfolded" from about the cortex to provide the brain slice map.
Figure 25:
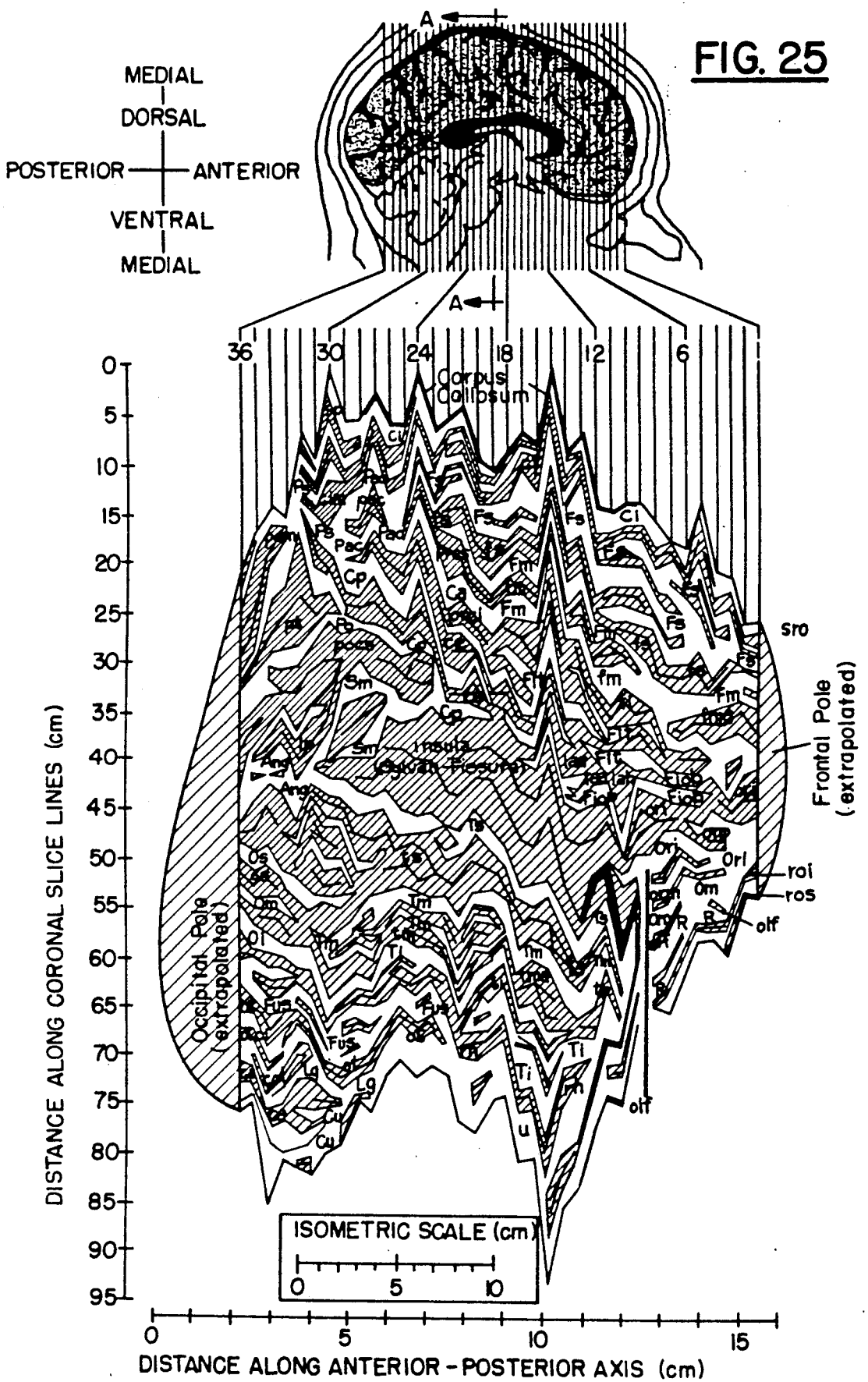
FIG. 25 illustrates a brain slice map of an entire right hemisphere of a human cerebral cortex.

A complete cortical map of the right hemisphere of a human is shown in FIG. 25 as it may be produced employing the invention herein described. In FIG. 26, a section 200 of the hemisphere taken along line A—A, is illustrated and arrows 202 and 204 indicate how the cortex of the brain is "unwrapped" and is configured in FIG. 25.

The abbreviations used to label the map of FIG. 25 are shown below. Gyral abbreviations are capitalized; sulcal abbreviations are lower case.

| Gyri | |
|---|---|
| Gyrus angularis | Ang |
| Gyrus centralis anterior | Ca |
| Gyrus centralis posterior | Cp |
| Cuneus | Cu |
| Gyrus frontalis inferior | Fi |
| pars obitalis | Fiorb |
| pars triangularis | Fit |
| pars opercularis | Fiop |
| Gyrus frontalis medius | Fm |
| Gyrus frontalis superior | Fs |
| Gyrus fusiformis | Fus |

-continued

| | |
|---|---|
| Gyrus Cinguli | Ci |
| Gyrus lingualis | Lg |
| Gyrus occipitalis inferior | Oi |
| Gyrus occipitalis medius | Om |
| Gyrus orbitalis lateralis | Orl |
| Gyrus orbitalis medialis | Orm |
| Gyrus occipitalis superior | Os |
| Praecuneus (Foville) | Pc |
| Gyrus parietalis inf. intermedius | Pim |
| Lobulus parietalis superior | Ps |
| Gyrus rectus | R |
| Gyrus supramarginalis (Gratiolet) | Sm |
| Gyrus temporalis inferior | Ti |
| Gyrus temporalis medius | Tm |
| Gyrus temporopolaris | Tp |
| Gyrus temporalis superior | Ts |
| Uncus | U |
| Sulci and Fissures | |
| Sulcus arcue intercuneati | aic |
| Fissura calcarina | ca |
| Sulcus corporis callosi | cc |
| Sulcus centralis (Rolando) | ce |
| S. cinguli, sive supramarginalis | ci |
| Sulcus cinguli, pars marginalis | cim |
| Fissura collateralis | col |
| Sulcus centralis | cs |
| Sulcus cunei | cu |
| Sulcus frontalis inferior | fi |
| Sulcus frontalis medius | fm |
| Sulcus frontomarginalis | fma |
| Sulcus frontalis superior | fs |
| Fissura hippocampi | h |
| Incisura capitis | ic |
| Sulcus intralimbicus | il |
| Sulcus occipitalis inferior | io |
| Sulcus intraparietalis | ip |
| Sulcus praeoccipitalis | ipo |
| Sulcus intraparietalis | itp |
| Fissura lateralis (Sylvius) | la |
| ramus horizontalis | lah |
| ramus ascendens | laa |
| Sulcus lunae | lun |
| Sulcus occipitalis anterior | oa |
| Sulcus olfactorius | olf |
| Sulcus intraopercularis | oper |
| Sulcus orbitalis arcuatus | ora |
| Sulcus orbitalis lateralis | orl |
| Sulcus orbitalis medialis | orm |
| Sulcus orbitopolaris | orp |
| Sulcus occipitalis superior | os |
| Sulcus occiptotemporalis | ot |
| Sulcus occipitotemporalis accessorius | ota |
| Sulcus occipitalis transversus inferior | otri |
| Sulcus occipitalis transversus superior | otrs |
| Sulcus polaris anterior | pa |
| Sulcus paracentralis | pac |
| Fissura parieto-occipitalis | po |
| pars medialis | pom |
| pars lateralis | pol |
| Sulcus postcentralis inferior | poci |
| Sulcus postcentralis superior | pocs |
| Sulcus praecentralis | prc |
| Sulcus praecentralis superior | prcs |
| Sulcus praecentralis inferior | prci |
| Sulcus principalis | ps |
| Sulcus parietalis transversus | pt |
| Sulcus radiatus | ra |
| Sulcus retrocentralis transversus | rct |
| Sulcus rhinalis | rh |
| Sulcus rostralis inferior | roi |
| Sulcus rostralis superior | ros |
| Sulcus arcue superior | sa |
| Sulcus suprarostralis | sro |
| Sulcus temporalis superior | sts |
| Sulcus lateralis (Sylvius) | syl |
| Sulcus temporalis inferior | ti |
| Sulcus temporalis medius anterior | tma |
| Sulcus temporalis medius post. | tmp |
| Sulcus temporopolaris | tp |
| Sulcus temporalis superior | ts |

The hardware utilized to generate the cortical map of FIG. 25 was a Macintosh II computer with 2 megabytes of RAM, a 20 megabyte hard disk, an external disk drive with double-sided, 800K hard disks and a Kurta IS One digitizing table. The "KURT PENWORKS" program was used to configure the graphics tablet for use with the mapping program. The programs were written in "Light Speed PASCAL".

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for deriving a planar representation of a three-dimensional surface, comprising the steps of:
   a. deriving a plurality of tomographic slices of said three-dimensional surface;
   b. positioning reference points about a perimeter surface of each said tomographic slice;
   c. creating a straight line representation of each said surface with its reference points, each said straight line representation having a length value proportional to the perimeter of the surface from which it was created;
   d. adjusting said straight line representations to be adjacent to each other in the order of their respective tomographic slices, to thereby create a planar map of said three-dimensional surface when said straight line representations are plotted; and
   e. reducing distortion between said straight line representations by finding the average minimum distance between positionally closest reference points on adjacent slice surface lines, and repositioning said straight line representations in accordance with said findings.

2. The method of claim 1 wherein said positioning step (b) further comprises the steps of:
   b1. producing a plurality of nested crest outlines for each tomographic slice; and
   b2. assigning to each intersection of a perimeter surface of a tomographic slice and said nested crest outlines, reference points having X, Y, and Z dimension values.

3. The method of claim 1 wherein said reducing distortion step (e) further comprises the step of:
   e1. deriving a connection table which, for each reference point, notes the dimension values of a positionally closest reference point on an adjacent tomographic slice perimeter surface.

4. The method of claim 3 wherein said connection table includes, for each slice, a list of reference points about the perimeter surface of each slice, each reference point listing comprising three dimensional reference values and an indication of the physically closest reference point on an adjoining perimeter surface.

5. The method of claim 4, wherein said reducing distortion step (e) further comprises the steps of:
   e2. repetitively moving a straight line representation with respect to an adjacent straight line representation and determining for each move, the distance between positionally closest reference points on said representations;
   e3. ceasing said repetitive move step (e2) when a minimum value is determined between positionally closest reference points on one said straight line representation and an adjacent straight line representation; and e4. repeating steps e2 and e3 for all straight line representations.

6. A method for deriving a planar representation of a three dimensional surface, such representation exhibiting a minimum distortion for a selected surface area, the method comprising the steps of:

a. deriving a plurality of tomographic slices of said three-dimensional surfaces;

b. positioning reference point about a perimeter surface of each said tomographic slice;

c. creating a straight line representation of each said surface with its reference points, each said straight line representation having a length value proportional to the length of the perimeter surface from which it was created;

d. adjusting said straight line representations so that when plotted as a planar map, they are positioned in order of their respective tomographic slices;

e. determining and noting positionally closest reference points on adjacent straight line representations;

f. determining a reference point positioned within said selected surface area; and g. rearranging said straight line representations to align said determined reference point and positionally closest reference points on other straight line representations whereby area distortion of said selected surface area is minimized.

7. The method of claim 6 wherein said positioning step (b) further comprises the steps of:

b1. producing a plurality of nested crest outlines for each tomographic slice; and b2. assigning to each intersection of a perimeter surface of a tomographic slice and said nested crest outlines, reference points having X, Y, and Z dimension values.

8. The method of claim 6 wherein said reducing distortion step (e) further comprises the step of:

e1. deriving a connection table which, for each reference point, notes a positionally closest reference point on an adjacent tomographic slice perimeter surface.

* * * * *